(12) United States Patent
Hamulski

(10) Patent No.: US 6,783,864 B2
(45) Date of Patent: Aug. 31, 2004

US006783864B2

(54) LABELING FILM, METHOD FOR PRODUCTION AND USE THEREOF

(75) Inventor: Markus Hamulski, Gronau (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 0 days.

(21) Appl. No.: 10/240,066

(22) PCT Filed: Feb. 5, 2002

(86) PCT No.: PCT/EP02/01147
§ 371 (c)(1),
(2), (4) Date: Sep. 27, 2002

(87) PCT Pub. No.: WO02/066247
PCT Pub. Date: Aug. 29, 2002

(65) Prior Publication Data
US 2003/0091848 A1 May 15, 2003

(30) Foreign Application Priority Data
Feb. 17, 2001 (DE) .......................................... 101 07 592

(51) Int. Cl.⁷ ............................................... B32B 27/08
(52) U.S. Cl. ....................... 428/517; 428/515; 428/354; 428/336; 428/339
(58) Field of Search ................................ 428/515, 517, 428/354, 336, 339, 355 BL, 355 EN, 195, 220, 519

(56) References Cited

U.S. PATENT DOCUMENTS 5,385,781 A * 1/1995 Chundury et al. .......... 428/330
6,042,907 A 3/2000 Blackwelder et al.
2003/0091850 A1 * 5/2003 Niepelt ....................... 428/515

FOREIGN PATENT DOCUMENTS

| DE | 198 59 790 | 12/1998 |
|---|---|---|
| EP | 0 470 486 | 2/1992 |
| WO | WO 98 22281 | 5/1998 |
| WO | WO 98 52749 | 11/1998 |

* cited by examiner

Primary Examiner—David J. Buttner
Assistant Examiner—Christopher Keehan
(74) Attorney, Agent, or Firm—Collard & Roe, P.C.

(57) ABSTRACT

Film for the manufacture of self-adhesive, especially label films laminates, which may be stamped, consisting of at least three layers, by which the inner layer contains polyolefine and/or olefin-copolymers and at least one additional layer each is present on both sides of the inner layer. This additional layer should contain a mixture of styrene-butadiene-styrene-blockcopolymers and polystyrene-homopolymers. The invention also refers to a process for the manufacture and the use of such a film.

9 Claims, 1 Drawing Sheet

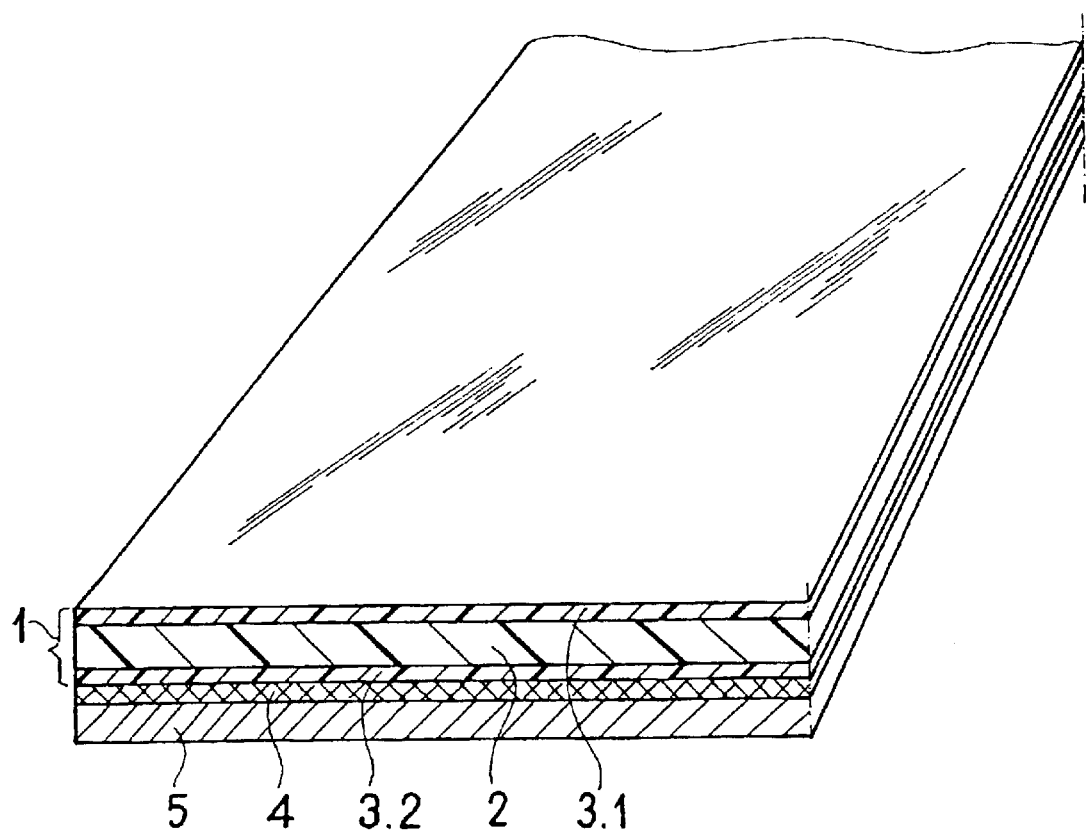

LABELING FILM, METHOD FOR PRODUCTION AND USE THEREOF

CROSS REFERENCE TO RELATED APPLICATIONS

Applicant claims priority under 35 U.S.C. §119 of German Application No. 101 07 592.8 filed Feb. 17, 2001. Applicant also claims priority under 35 U.S.C. §365 of PCT/EP02/01147 filed Feb. 5, 2002. The international application under PCT article 21(2) was not published in English.

BACKGROUND OF THE INVENTION

The invention concerns a film for the manufacture of self-adhesive, especially label film laminates that may be stamped, a process for its manufacture as well as its use.

Multilayered label films are known (U.S. Pat. No. 6,042,907), which comprise two unfoamed layers and essentially consist of polyolefin, polystyrene or styrene-butadiene-styrene-blockcopolymers as a compatibility agent. The known label film is structured in two layers, it can however carry additional layers that have certain functions. Such label films are characterized as "blend films" (Engl. blend= Mischung) The special characteristic of polyolefin, namely abrasion resistance and hardness in combination with rigidness and machine-processability, can in this way be combined as the outstanding characteristics of polystyrene.

Experiments have shown that a blend of polyolefins and polystyrene as a layer delivers results for the purpose of the U.S. patent, however these results have to be improved, especially with regard to the production. Furthermore, the known blend films have the disadvantage that the blends always lead to cloudy films, since polyolefin-polystyrene blends do not provide a homogenous crystalline structure.

The task of the invention at hand was to provide an improved label film. The improved film should be able to be manufactured cost-efficiently. It should be easy to cut and perforate and also be superior to the known film with regard to its elastic capability and its puncture resistance. It should also possess a high level of transparency and glossiness and a high usage value. Finally, the printability of the film must also be guaranteed.

This task was able to be solved in that, for a film of the type mentioned at the beginning, consisting of at least three layers, the inner layer consists of polyolefins and/or olefin-copolymers and for which the layers present on both sides of the inner layer consist of a blend of styrene-butadiene-styrene-blockcopolymers and polystrene-homopolymers. A mixing or making compatibile of polyolefins and polystyrene does not occur.

Other known self-adhesive laminates are used for the labeling and ticketing of products. These laminates are composed of a base material, pressure sensitive adhesive and a cover film (usually of siliconized paper or plastic material). In addition to paper, polyolefin film also serves as base material. For example, polyethylene film in thicknesses between 70 and 150 µm and biaxial oriented polyprophlen-films in a thickness between 50 to 60 µm are used. The latter have a high specific bending resistance, which makes them useable even for these small thicknesses.

It has however been determined that films oriented in such a way have a very small elastic capability and malleability, which is necessary for the labeling of embossed surfaces and for containers that are deformed after being filled.

A laminated labeling film for the labeling in the blow mold is known from DE 198 59790 A1. The films of the type here claimed in claim 1 differ from this. With the known laminated label films, for example, a multi-layered inner ply is mentioned that is laminated onto a polyolefin stiffening ply, whereby the inner ply can also be multilayered. It can comprise of a core layer and an outer seal layer of polystyrene. This polystyrene layer should be able to be sealed to a plastic container at 600° C. to 100° C. For the film at hand, comparable layers are not manufactured from polystyrene, but rather of a mix of SBS-blockcopolymers and polystyrene-homopolymers. This is also not an IML-film.

Therefore, in the task mentioned above, the known films should be improved with regard to elastic capability and malleability. Even this requirement is mastered by the new film system mentioned, polystyrene-polyolefin-polystyrene.

BRIEF DESCRIPTION OF THE DRAWING

The FIGURE shows the typical structure of a film and the laminate that emerges with it.

In this embodiment, in particular, an adhesive layer 4 is provided on a siliconized paper base 5 with approximately 58–65 µm thickness, binding to the actual film and making the label sticky. The film possesses an inner layer 2, which consists of a polypropylene random copolymer with ethylene. The two outer layers 3.1 and 3.2 are composed of percent by weight styrene-butadiene-styrene-block copolymer and 30 percent by weight polystyrene. The film material punched out to the upper side of the paper base, so that the individual labels are detachable as cutouts furnished with an adhesive layer. They can then be directly applied to a container or similar (not illustrated).

DETAILED DESCRIPTION OF THE INVENTION

The total thickness of the film is not subject to any particular restrictions, but rather depends essentially on the type of labeling characteristic as well as economic considerations. It however usually lies in the area of 30 to 100 µm, especially in the area of 40 to 70 µm.

The ratio in thickness of the inner layer to the thickness of the two layers that border this layer is likewise not subject to any fundamental restrictions. It however turns out to be advantageous if the ratio of thickness of the layer present on each side of the inner layer amounts to 1:1 to 1:6 to the thickness of the inner layer. A ratio of 1:2 to 1:4 is especially preferred.

It is preferred that the inner layer essentially contains polyolefins and/or olefin-copolymers or consists primarily of these. Thus, the core can also consist totally of polyolefins and/or olefin-copolymers. Polymers on the basis of ethylene and propylene, as well as blends of the two or with other olefins, such as e.g. butylene have proven to be especially suitable. The use of such polyolefines or olefin-copolymers leads particularly to an improvement of the elastic capability and puncture resistance. Moreover, through the increased use of polyolefins or olefin-copolymers in relation to the SBS-blockcopolymers, the cost effectiveness of the product is increased.

Through the use of blends of styrene-butadiene-styrene-blockcopolymers with polystyrene-homopolymers as outer layers, the label film is sufficiently bestowed with good characteristics and easier to cut and perforate.

The films according to the invention can also be dyed, in as far as transparency can be dispensed with, for example with titanium dioxide in order to get e.g. a white film. Due to the structure of the film, good printability is also guaranteed. A further coating of these films in order to improve its printability is also possible. For this, for example a metalization, such as e.g an aluminum vaporization, a surface coating or vaporization with inorganic materials, like for example $SiO_x$ or $Al_2O_3$, comes into consideration. Moreover, a coating is possible by plasma polymerization or with polyvinylidene chloride or with organic inorganic hybridpolymers. Also, a coating is possible with an adhesive, especially a pressure sensitive adhesive, as is known to be used for labels, with or without protective film.

The invention at hand also makes available a process for the manufacture of the films in accordance with the invention. Thus it was ascertained that a coextrusion on a conventional extrusions facilities, especially blow film extrusion facilities and fishtail die extrusion facilities, is advantageous. It has proven to be especially advantageous to manufacture the films with high portion of polyethylene in the inner layer through blow film extrusion, while films on polypropylene basis can be processed advantageously on fishtail die extrusion facilities.

When using a label film in the form of a label film sleeve, as is especially common for round containers and bottles, for which the overlapping edges of the label film are bound with a hot-melt adhesive or another adhesive, it is especially advantageous to adjust the parameters of the adhesive and SBS-layer in such a way that the sheer stress coefficient of the hot-melt adhesive is greater than the stress coefficient of the glued layers. Through this, it is achieved that the container can expand after being filled without tearing the label, especially if the container is made from PET. Pure polyolefin films do not offer this possibility.

The examples listed below should serve to clarify the invention (Note: In as far as it is not otherwise defined, all %-data refers to percentages by weight).

EXAMPLE 1

A three-layer film is coextruded on a blow film extrusion facility (nozzle diameter 315 mm). The inner layer consists of a polyethylene-copolymer with butylene, whereby the density of the polyethylene corresponds to 0.918 to 0.940 g/cm$^3$ and the melt index is between 0.7 to 4 g/10 min. at 190° C. and 2.16 kg. The two layers that border on the inner layer are composed of 10 to 80 percent by weight styrene-butadiene-styrene-blockcopolymer and 90 to 20 percent by weight polystyrene. Additionally, a static inhibitor is used.

The total thickness of the film is 50 μm, whereby the thickness of both outer layers is 10 μm each and the thickness of the inner layer is 30 μm.

EXAMPLE 2

A three-layer film is coextruded on a coextrusion fishtail die facility. For the inner layer, a polypropylene-random copolymer with ethylene is used (density of the polypropylene is 0.902 g/cm$^3$ and the melt index is 6 g/10 min. at 230° C. and 2.16 kg). The two layers of 7 μm bordering on the inner layer of 36 μm are composed as described in Example 1. The total thickness of the film is 50 μm.

COMPARATIVE EXAMPLE 1

A three-layer film is coextruded on a blow film facility as in example 1. The inner layer of the film consists of a polyethylene of high density (0.957 g/cm$^3$; melt index 0.9 g/10 min. at 190° C. and 2.16 kg). The outer layers were coextruded from an LD-polyethylene of the density 0.928 g/cm$^3$, melt index 2 g/10 min. at 190° C. and 2.16 kg. The total thickness of the film is 50 μm.

COMPARATIVE EXAMPLE 2

A three-layer film is coextruded on a coextrusion fishtail die facility as described in example 2. The inner layer of the film consists of a propylene-homopolymer, density 0.910 g/cm$^3$ and a melt index of 10 g/10 min. at 230° C. and 2.16 kg. The outer layers that border on the inner layer are extruded from a propylene-randomcopolymer with ethylene with the density of polypropylene of 0.902 g/cm$^3$, with a melt index of 6 g/10 min. at 230° C. and 2.16 kg. The total thickness of the film is 50 μm.

Assessment of the Examples or the Comparative Examples

The films of examples 1 and 2, which possess outstanding characteristics and distinguish themselves by their very good optical characteristics and high rigidity, were processed to self-adhesive laminates. Subsequently, the laminate was printed on, the label was punched out and automatically applied trouble-free on flexible containers, which were made of PET. The film mentioned in comparative example 1 were processed in the same way to self-adhesive laminate. Problems already occurred when punching the labels. When automatically punching the labels, the rigidity of the material was not sufficient, so that there were breakdowns of the labeling machine. The film according to comparative example 2 can be processed well to laminate and can be printed trouble-free. When punching, however, problems sporadically occurred. Automatic labeling was practically impossible because of the lack of rigidity of the film.

What is claimed is:

1. A labeling film laminate comprising a base material, an adhesive layer of pressure sensitive adhesives and a multilayered film, which may be stamped and printed, attached to the adhesive layer, wherein the multilayered film consists of at least 30 to 100 μm thick coextruded film having three layers, of which the inner layer consists of polyolefins and/or olefin-copolymers, and of which the layers present on both sides of the inner layer consist of a blend of styrene-butadiene-styrene-block copolymers and polystyrene-homopolymers.

2. A labeling film according to claim 1, wherein the coextruded film possesses a thickness of 40 to 70 μm.

3. A labeling film according to claim 1, wherein the thickness ratio of the layer present on each side of the inner layer of the coextruded film is 1:1 to 1:6 to the thickness of the inner layer.

4. A labeling film according to claim 3, wherein the thickness ratio is 1:2 to 1:4.

5. A labeling film according to claim 1, wherein the polyolefin of the inner layer of the coextruded film is selected from the group consisting or polyethylene, polypropylene, polyethylene-copolymer, and polypropylene-copolymer.

6. A labeling film according to claim 1, wherein the layer of the coextruded film consisting of a blend of styrene-butadiene-styrene-block copolymers and polystyrene-homopolymers contains 10 to 80 percent be weight SBS-block copolymers and 90 to 20 percent by weight polystyrene.

7. A labeling film according to claim 1, wherein the coextruded film additionally contains pigments.

8. A labeling film according to claim 1, wherein at least one additional layer is applied to the coextruded film through vaporization or coating with a substance selected from the group consisting of metals, inorganic materials, polyvinylidene chloride, and organic-inorganic-hybrid polymers or through plasma polymerization.

9. A labeling film according to claim 8, wherein the additional layer has a surface to be printed on.

* * * * *